(No Model.) 2 Sheets—Sheet 1.

J. M. WALKER.
COMBINED PLANTER, HARROW, AND CULTIVATOR.

No. 326,180. Patented Sept. 15, 1885.

WITNESSES

INVENTOR
James M. Walker.
By his Attorney

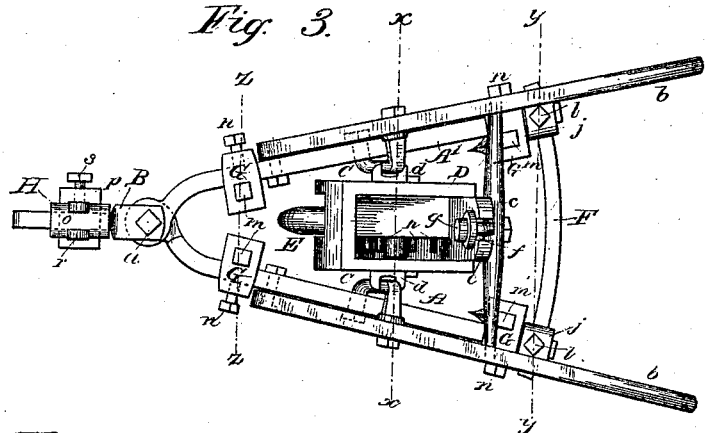

UNITED STATES PATENT OFFICE.

JAMES MONROE WALKER, OF ROOPVILLE, GEORGIA.

COMBINED PLANTER, HARROW, AND CULTIVATOR.

SPECIFICATION forming part of Letters Patent No. 326,180, dated September 15, 1885.

Application filed May 14, 1885. (No model.)

*To all whom it may concern:*

Be it known that I, JAMES M. WALKER, a citizen of the United States, residing at Roopville, in the county of Carroll and State of Georgia, have invented a new and useful Improvement in a Combined Planter, Harrow, Plow, and Cultivator, of which the following is a specification, reference being had to the accompanying drawings.

My invention relates to a combined planter, harrow, double plow, and cultivator; and it consists in the improved construction and combinations of parts, hereinafter fully described, and pointed out in the claims, whereby a device of the character above mentioned is provided, which is cheap and simple in its construction, effective in its operation, strong and durable, and one which may be readily and easily converted into any one of the devices named.

Figure 1:
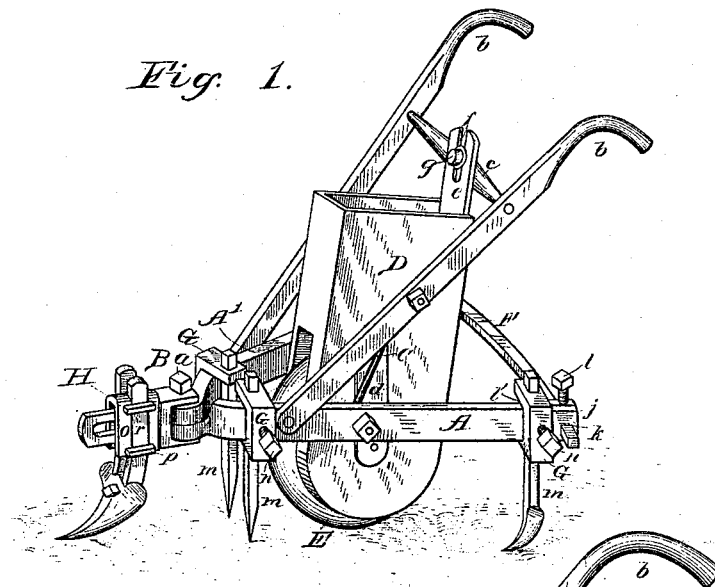
Figure 2:
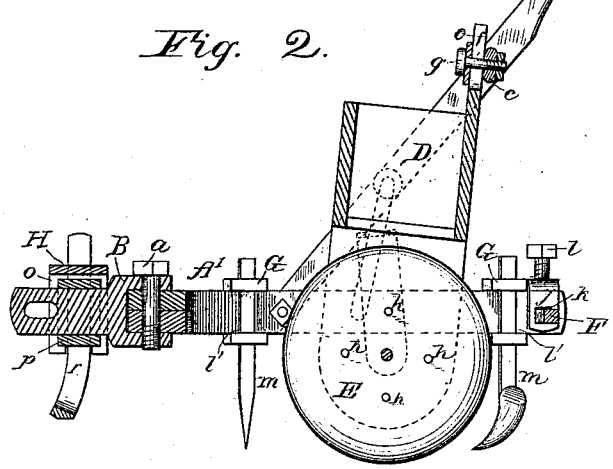
Figure 7:
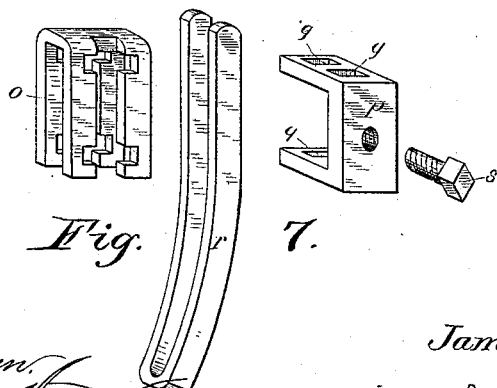

In the drawings, Figure 1 is a perspective view of my improvement. Fig. 2 is a longitudinal vertical section of the same, taken centrally through the device. Fig. 3 is a plan. Fig. 4 is a section on the line $x\,x$ of Fig. 3. Fig. 5 is a section on the line $z\,z$ of Fig. 3, and Fig. 6 is a section on the line $y\,y$ of Fig. 3, and Fig. 7 is a detail view of the clamp for holding the furrow-opener and plows.

In the accompanying drawings, in which like letters of reference indicate corresponding parts in all the figures, A A' represent converging beams, the forward ends of which are flattened and provided with holes or openings. The said flattened ends of the beams A A' are lapped and pivoted in the divided end of a link, B, by a bolt, $a$, the forward end of said link having a hole or opening to which the draft attachment is designed to be secured. Bolted to the beams A A', near the forward ends thereof, are handles $b$, which are connected near their upper ends by a cross-bar, $c$.

C represents rods, the upper and lower ends of which are bent outwardly, and are bolted or otherwise secured to the beams A A' and the handles $b$.

D represents a hopper located between the beams A A'. To the sides of the hopper D are secured plates $d$, the upper ends of which are turned outwardly and slotted to receive the rods C. At the upper rear end of the hopper is provided an extension, $e$, which is provided with a slot, $f$, through which passes a bolt, $g$, extending from the cross-bar $c$, which connects the handles $b$. It will thus be seen that by loosening the nut on the said bolt the hopper can be raised or lowered the length of the slot, the slotted plates $d$ sliding upon the rods C, the function of said plates being to hold the hopper against forward or rearward movement.

The lower end of the hopper D is cut away to receive a carrying-wheel, E, which is journaled therein. This wheel, in addition to serving as a support for the frame, is provided with a radial series of outwardly-extending stirrer-pins, $h$, said hopper being especially adapted for planting cotton-seed. The rear ends of the beams A A' are provided with transverse slots or openings $i$, and fitting over the ends of said beams are brackets $j$, provided with openings $k$, which register with the openings $i$ in the beams A A'.

Connecting the beams A A' is a curved bar, F, which passes through the registering-openings $i\,k$; and said bar is clamped so as to hold the beams A A' at any desired adjustment by thumb-screws I, working in openings in the brackets $j$ and bearing with their ends upon the beams A A'.

Upon the beams A A' are mounted clamps G, which are recessed, as at I', to receive said beams A A'. Vertical passages or openings are provided in the clamps G, and adapted to fit in said passages or openings are cultivator or harrow teeth $m$. The clamps are held rigid upon the beams at any desired adjustment by means of set-screws $n$, working in threaded openings in the clamps and bearing against the beams A A'.

Upon the link B is placed a clamp, H, to which the furrow-opener is designed to be attached. This clamp consists of a divided plate, $o$, fitting over the link B, and having transverse slots near its upper and lower ends, which slots are adapted to be engaged by a plate, $p$, substantially U shape in form, and having slots or openings $q$ near each end, for the passage of a curved plate, $r$, composed of two parts connected at one end, the furrow-opener being attached to said plate $r$, and said plate $r$ being vertically adjustable by means of a set-screw, $s$, working in an opening in the plate $p$, and bearing against one of the parts of the said plate.

The operation is as follows: When the device is to be used as a planter, the furrow-opener is employed on the link B, and coverers of the same construction and clamped in the same manner as the furrow-opener are attached to the rear ends of the beams A A'.

When the device is to be used as a plow, the hopper is detached and the furrow-opener, which is bolted to the plate $r$, in connection with the coverers at the rear ends of the beams A A', is employed.

If the device is to be used as a cultivator, the clamps G are fitted on the beams A A', and cultivator-teeth of any suitable construction are fitted thereon and secured by the set-screws. In this instance the furrow-opener and cultivator-teeth serve as cultivators.

If the device is to be used as a harrow, harrow-teeth may be substituted for the cultivator-teeth.

I claim and desire to secure by Letters Patent—

1. The combination, with a frame, of the hopper, the handles, the rods C, connecting the handles and beams, plates $d$, having out-turned slotted ends engaging the rods C and secured to the hopper, the slotted extension $e$, and a bolt and nut extending from bar $c$ and engaging the slotted extension, as set forth.

2. The clamp H, consisting of the divided plate $o$, having transverse slots, a plate, $p$, engaging said slots and having vertical openings, and a curved plate, $r$, to which the furrow-opener is attached, said plate $r$ engaging the openings of plate $p$, and a set-screw for clamping the parts together, substantially as set forth.

In testimony that I claim the foregoing as my own I have hereto affixed my signature in presence of two witnesses.

JAMES MONROE WALKER.

Witnesses:
J. K. ROOP,
G. F. VANCE.